United States Patent [19]

Lischin

[11] 4,425,480

[45] Jan. 10, 1984

[54] TELEPHONE STATION APPARATUS WITH SELECTIVE RESTRICTING OF LOCAL CALLS

[75] Inventor: Alan J. Lischin, Lauderdale Lakes, Fla.

[73] Assignee: Communication Equipment and Engineering Co., Plantation, Fla.

[21] Appl. No.: 323,194

[22] Filed: Nov. 20, 1981

[51] Int. Cl.³ .............................................. H04M 1/66
[52] U.S. Cl. ............................... 179/90 D; 179/18 DA
[58] Field of Search ...... 179/6.3 CC, 18 DA, 90 BD, 179/90 D, 189 R, 189 D

[56] References Cited

U.S. PATENT DOCUMENTS 3,992,588 11/1976 Hunsicker ...................... 179/18 DA
4,000,380 12/1976 Jackson ............................ 179/90 D
4,012,602 3/1977 Jackson ............................ 179/90 D
4,124,781 11/1978 Mellon ...................... 179/18 DA X
4,251,692 2/1981 Waldman ...................... 179/18 DA

FOREIGN PATENT DOCUMENTS 849533 7/1981 U.S.S.R. ...................... 179/18 DA

*Primary Examiner*—A. D. Pellinen
*Assistant Examiner*—Keith E. George
*Attorney, Agent, or Firm*—Mason, Kolehmainen, Rathburn & Wyss

[57] ABSTRACT

Station apparatus is provided for exclusively handling calls without the use of coins including credit cards calls, collect calls, third party charge calls, in WATS calls (800 numbers), emergency calls, directory assistance calls, etc. The station apparatus is especially useful to provide service when interconnected with central office equipment that does not have provisions for automatically blocking local calls, i.e. equipment that does not have local call exclusion features such as found in electronic exchanges. The station apparatus prohibits local calls by opening the loop to the central office if more than a predetermined number of digits are dialed unless the first digit is a "0" or a "1". Thus, the dialing of such numbers as 911, 411, 611, 1911, 0, 0+ is permitted while local calls are prevented.

13 Claims, 3 Drawing Figures

TELEPHONE STATION APPARATUS WITH SELECTIVE RESTRICTING OF LOCAL CALLS

BACKGROUND OF THE INVENTION

1. Field of the Invention

The present invention relates generally to the field of telephone station apparatus and more particularly to station apparatus for exclusively handling calls without the use of coins.

2. Description of the Prior Art

Various station apparatus are known in the art characterized as pay stations or coin operated telephones on which sent paid toll calls are accomplished by the deposit of coins. Further other calls not requiring the deposit of coins are also handled under the supervision of the central office equipment and/or an operator.

Other coinless station apparatus is known the functions under the supervision of the central office equipment to provide for credit card calls, third party charge calls, in Watts calls (800 numbers), emergency calls, directory assistance calls, etc. These types of coinless station apparatus require central office equipment with local call exclusion features to block the completion of local calls that require tolls or tariffs.

While the aforementioned station apparatus of the prior art functioning under the supervision of central office equipment is generally suitable for their intended purposes, it would be desirable to provide station apparatus for coinless calls such as charge calls from locations where the central office equipment does not include local call exclusion equipment or features.

SUMMARY OF THE INVENTION

Accordingly it is a principal object of the present invention to provide station apparatus for exclusively handling calls without the use of coins with the station apparatus prohibiting local calls of a predetermined type unless the first digit dialed is a zero or a one.

It is another object of the present invention to provide station apparatus for handling calls without the use of coins in locations where the central office equipment does not include provisions for automatically blocking local calls.

Briefly these and other objects of the present invention are efficiently achieved by providing station apparatus for exclusively handling calls without the use of coins including credit cards calls, collect calls, third party charge calls, in Watts calls (800 numbers), emergency calls, directory assistance calls, etc. The station apparatus is especially useful to provide service when interconnected with central office equipment that does not have provisions for automatically blocking local calls, i.e. equipment that does not have local call exclusion features such as found in electronic exchanges. The station apparatus prohibits local calls by opening the loop to the central office if more than a predetermined number of digits are dialed unless the first digit is a "0" or a "1". Thus, the dialing of such numbers as 911, 411, 611, 1911, 0, 0+ is permitted while local calls are prevented.

The invention both as to its organization and method of operation, together with further objects and advantages thereof, will best be understood by reference to the following specification taken in conjunction with the accompanying drawings in which.

DETAILED DESCRIPTION

Figure 1:
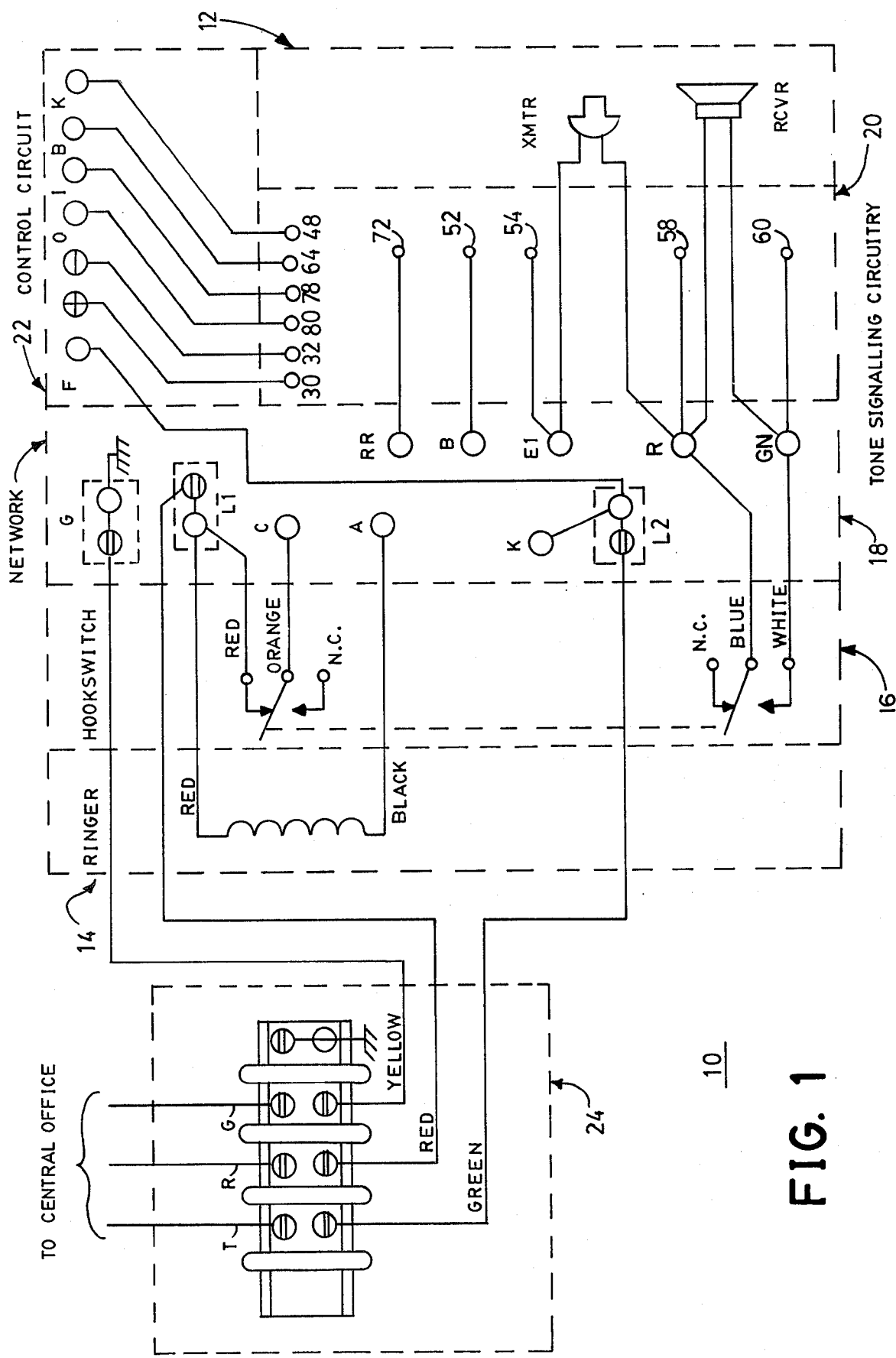
FIG. 1 is an electrical schematic and interconnection digram of the station apparatus of the present invention.

Referring now to FIG. 1, the station apparatus 10 of the present invention includes a hand set 12, a ringer 14, a hook switch 16 and a 2500 series network 18 in accordance with conventional telephone apparatus hardware. The station apparatus 10 also includes tone signalling circuitry 20 and a control circuit 22 both interconnected as shown in FIG. 1 with the station apparatus hardware. A terminal block 24 connects the tip,ring and ground wire connections depicted respectively as T,R and G from the central office. The ringer 14, the hook swtich 16, the network 18 and the handset 12 are interconnected as shown in FIG. 1 in accordance with conventional practice with the tip,ring and ground leads from the central office.

Figure 2:
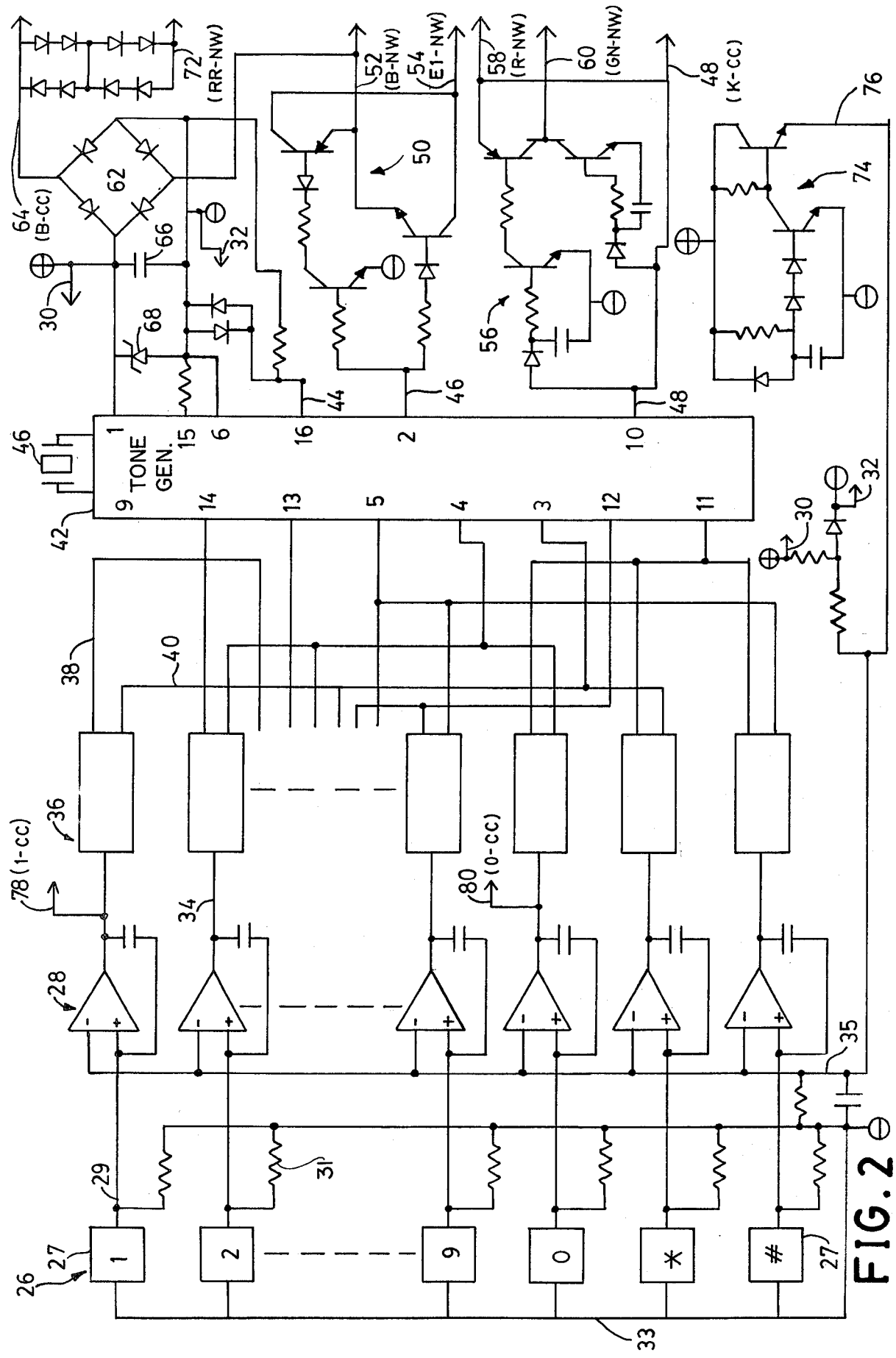
FIG. 2 is a block diagram and electrical schematic representation of tone signalling circuity that is suitable for use with the station apparatus of the present invention.

Referring now to FIG. 2, the tone signalling circuitry 20 includes an input array of key pad areas arranged to provide a conventional telephone input array including the numerals one through zero and the symbols * and # generally referred to at 26. In the embodiment of FIG. 2, the input array 26 includes a pressure sensitive piezoelectric generator 27 formed by the array 26 corresponding to each of the respective key pad input array areas.

The output of each of the piezoelectric generators 27 in the array 26 is connected to the non-inverting input of a respective comparator stage in a comparator array 28. The output 29 of each of the piezoelectric generators 27 is also connected through a respective pull down resistor 31 to a negative supply voltage 32. The opposite end 33 of each of the piezoelectric generators 27 in the array 26 are commonly connected to the negative supply voltage 32. The inverting inputs of the comparators in the comparator array 28 are commonly connected to a reference voltage 35 derived through a resistor network connected between a positive voltage supply 30 and the negative supply 32. In a specific embodiment the supply voltage to each of the inverting inputs of the comparators in the array 28 is approximately 100 millivolts. Correspondingly in a specific embodiment, the output of each piezoelectric generator 27 in the array 26 when actuated exceeds 100 millivolts.

Thus each of the piezoelectric generators 27 in the array 26 forms a pressure sensitive piezoelectric generator to generate an output voltage at 29 upon actuation of the respective key pad area. When a particular key pad area is actuated, the output 34 of the respective comparator in the array 28 switches from the normally low state to a high state for a predetermined pulse duration time. The output 34 of each comparator in the array 28 is connected to a control lead of a respective analog switch in the analog switch array 36. Each of the analog switches in the array 36 includes two outputs 38, 40 which are connected by the switch when the switch is actuated over the control lead by the respective interconnected comparator output 34 in the array 28.

The outputs 38,40 of the analog switches in the array 36 are interconnected to seven inputs of a Mostek 5087 tone generator stage 42. Thus actuation of each key pad in the array 26 causes a particular predetermined connection between two of the inputs of the tone generator 42. The tone generator 42 is arranged to provide at a tone signalling output 44 standard multifrequency tone signalling in accordance with the particular two inputs that are interconnected. For example, when the key pad area in the array 26 corresponding to the numeral 5 is actuated, the tone generator 42 at 44 outputs the tone combination of 770 Hz and 1336 Hz. The tone generator 42 utilizes a crystal 46 to generate a reference frequency to determine the precise tone signals in the multifrequency tone signalling format. The inputs of the tone generator 42 include the pins 14, 13, 5, 4, 3, 12 and 11 of the 5087 device.

In an alternative embodiment, the inputs of the tone generator 42 are connected in a switch array with each of the switch array positions being controlled by a respective push button switch in a push button array.

The tone generator 42 also includes two control outputs 46 and 48. Control output 46 switches from a high to a low signal state when the tone signalling output 44 is active. Control output 48 switches from a low to a high signal state when the tone signalling output 44 is active. The control output 46 is connected to control a transmitter mute circuit 50. The transmitter mute circuit 50 is connected to the B terminal of the network 18 at 52. Further the transmitter mute circuit 50 is also connected at 54 via the E1 terminal of the network 18 to one side of the transmitter of the hand set 12. When the control output 46 switches to a low state, the transmitter mute circuit 50 opens the current path to the transmitter element of the hand set 12 to provide the transmitter mute function. This eliminates the possibility of transmitter noise interferring with tone signalling.

The control output 48 of the tone generator 42 is connected to a receiver bypass circuit 56. The receiver bypass circuit 56 is connected at 58 to the R terminal of the network and at 60 to the GN terminal of the network. Thus, the receiver bypass circuit 56 is connected as a parallel shunt across the receiver of the hand set 12.

When the control output 48 switches to a high level during tone signalling, a bypass path around the receiver of the hand set 12 is provided to attenuate the receiver sound level. This avoids extremely high levels to the user's ear when the high level tone signal is being generated.

The supply voltages 30 and 32 are provided at the output of a full wave bridge 62 connected between the B terminal of the network and the B terminal of the control circuit 22 at 64. The output of the full wave bridge 62 is filtered by a capacitor 66 and over voltage protection is provided by the zener diode 68. A diode array 70 is connected between the B terminal of the control circuit 22 at 64 and the RR terminal of the network at 72 to provide an increase in the voltage drop across the phone regardless of loop polarity to increase the available voltage supply by approximately 2½ volts.

Figure 3:
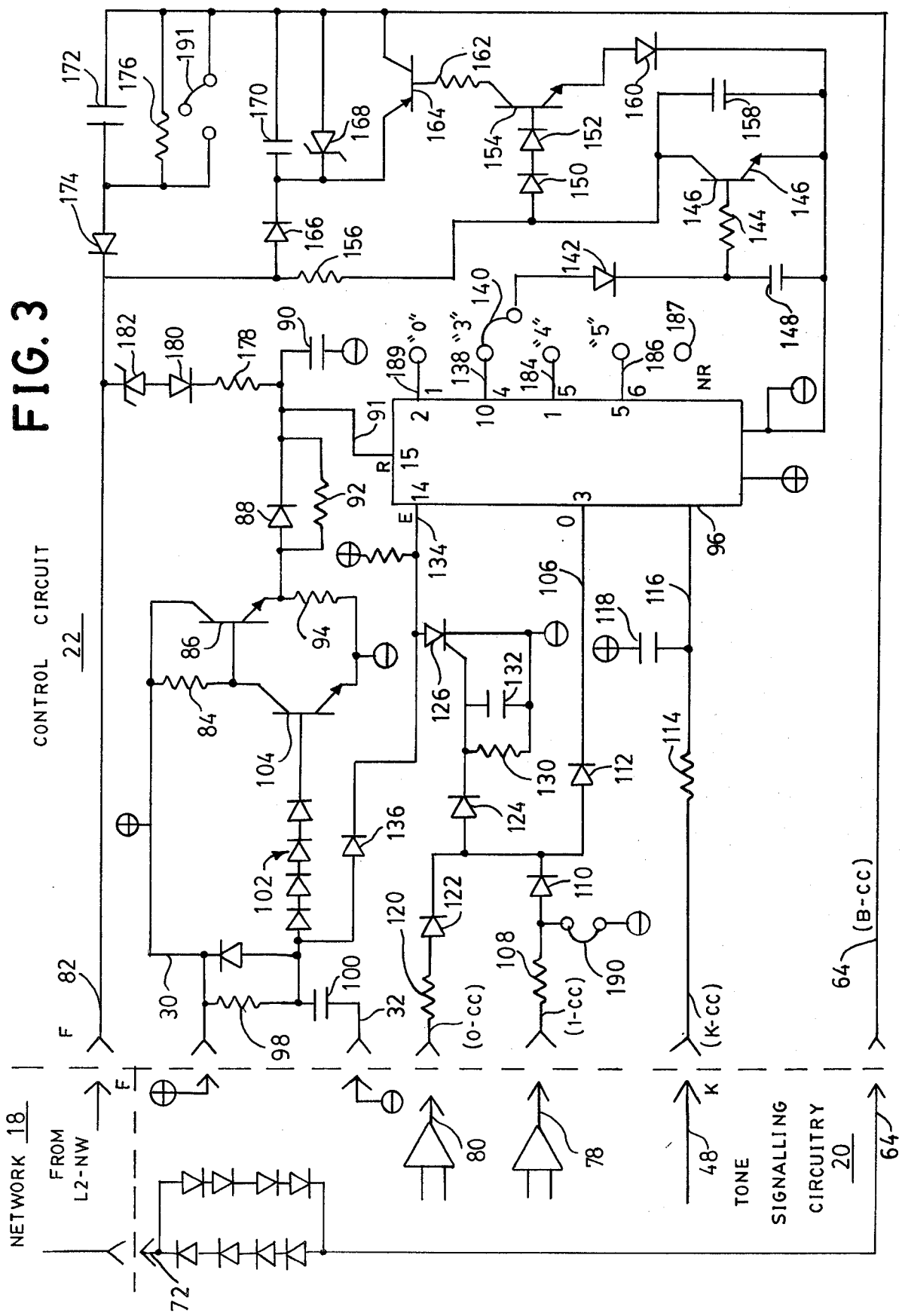
FIG. 3 is an electrical schematic representation of the control circuitry of the station apparatus of FIG. 1.

A dial disable circuit 74 is provided to disable the dial function during the transitory period when the power supply across 30 and 32 is rising as the hand set is first lifted off the hook switch. The dial disable circuit 74 includes an output at 76 that is connected to the comparator reference input 35 to perform the disable function during the transitory condition of the power supply. Referring now to FIG. 3, the control circuit 22 includes the positive supply voltage 30 and the negative supply voltage 32 as inputs from the tone signalling circuitry 20. The control output 48 from the tone generator 42 is connected at a K input to the control circuit 22. Further, the output 78 of the numeral 1 comparator in the array 28 and the output 80 of the numeral zero comparator are connected as inputs to the control circuit 22. The control circuit 22 also includes an input 82 connected to the L2 terminal of the network at the tip side of the telephone line pair.

Considering now the structure and operation of the control circuit 22 and the operation of the station apparatus 10, when the handset 12 is first lifted and the power supply across 30,32 builds up, current through a resistor 84 connected between the positive supply voltage 30 and the base of a transistor 86 causes the transistor 86 to conduct. The collector of the transistor 86 is connected to the positive supply voltage 30. The emitter of the transistor 86 is connected through a diode 88 arranged anode to cathode to one end of a capacitor 90. The other end of the capacitor 90 is connected to the negative supply voltage 32. A resistor 92 is connected across the diode 88. Another resistor 94 is connected between the emitter of the transistor 86 and the negative supply voltage 32.

When the transistor 86 conducts, the capacitor 90 is charged. The charge across the capacitor 90 is connected through line 91 to the reset input of a decade counter 96. Thus, the counter 96 is reset to the zero state upon the lifting of the hand set.

The series combination of a resistor 98 and a capacitor 100 is connected between the positive supply voltage 30 and the negative supply voltage 32. The junction of the resistor 98 and the capacitor 100 is connected through a series array 102 of four diodes arranged anode to cathode to the base of a transistor 104. The collector of the transistor 104 is connected to the base of the transistor 86. The emitter of the transitor 104 is connected to the negative supply voltage 32.

Approximately one second after the hand set is first lifted, the capacitor 100 is sufficiently charged to cause the transistor 104 to conduct which renders the transistor 86 nonconductive. Thus, the capacitor 90 discharges through the resistors 92 and 94 and the reset input at 91 returns to the normally low state. At this point, the zero output of the decade counter 96 at 106 is at a high signal state.

The input 78 to the control circuit 22 from the output of the numeral one comparator is connected through the series combination of a resistor 108, a first diode 110 arranged anode to cathode, and a second diode 112 arranged anode to cathode to the zero output 106 of the decade counter 96. With a high level signal at the zero outpput 106, the diode 112 is reversed biased and nonconductive.

If a zero is now entered or dialed via the input array 26, the control output 48 and the output 80 of the numeral zero comparator will both be high for a predetermined pulse duration. The control output 48 is connected through a series resistor 114 to a clock input at 116 of the decade counter 96. A capacitor 118 is connected between the clock input 116 and the positive supply voltage 30. The output 80 of the zero number comparator is connected through a resistor 120 and a diode 122 arranged anode to cathode to the junction of the diodes 110 and 112. The cathode of the diode 122 is connected to the anode of a diode 124. The cathode of the diode 124 is connected to the gate lead of an SCR 126. The parallel combination of a resistor 130 and a capacitor 132 are connected between the gate lead of the SCR 126 and the negative supply voltage 32. The cathode of the SCR 126 is connected to the negative supply voltage 32. The anode of the SCR 126 is connected at 134 to an enable input of the decade counter 96. The enable input 134 is also connected through a diode 136 arranged cathode to anode to the junction of the resistor 98 and the capacitor 100.

Thus, if a zero numeral is dialed and entered on the keypad array 26, the high input at 80 from the numeral zero comparator renders the SCR 126 conductive and the enable input at 134 to the decade counter 96 is pulled to a low level. At this point the decade counter 96 is disabled so that any pulses which appear at the clock input at 116 do not affect the counter 96. Thus, the zero output of the counter at 106 remains at a high level state for the duration of the call. In this situation the decade counter 96 was disabled without any further action so the call goes through without restriction.

If the first digit entered during a call was not the numeral zero, the control output 48 pulses and causes the counter 96 to step from a zero state to a one state. As a result, the zero output at 160 is a low level and the diode 112 is forward biased to disable the control path to the gate lead of the SCR 126. Thus, if any of the subsequent digits entered should happen to be the numeral zero, the pulse at 80 will be absorbed by the resistor 120 and the SCR 126 will remain nonconductive. In this situation, the SCR 126 cannot be rendered conductive and the decade counter 96 cannot be disabled through the duration of the call. Thus, the decade counter 96 will continue counting every digit that is entered.

The digital four output 138 of the decade counter 96 is connected as shown in FIG. 3 through a selective jumper connection 140 to the anode of a diode 142. The cathode of the diode 142 is connected through a resistor 144 to the base of an NPN transistor 146. A capacitor 148 is connected between the cathode of the diode 142 and the negative supply voltage 32. The emitter of the transistor 146 is connected to the negative supply voltage 32. The collector of the transistor 146 is connected through the series combination of two diodes 150 and 152 arranged anode to cathode to the base of a transistor 154. The collector of the transistor 146 is also connected through a resistor 156 to the input 82 from the L2 terminal of the network. A capacitor 158 is connected between the collector of the transistor 146 and the negative supply voltage 32. The emitter of the transistor 154 is connected to the anode of a diode 160. The cathode of the diode 160 is connected to the negative supply voltage 32. The collector of the transistor 154 is connected through a resistor 162 to the base of a PNP transistor 164. The collector of the transistor 164 is connected to the input 64 to the tone signalling circuitry 20. The emitter of the transistor 164 is connected to the cathode of a diode 166. The anode of the diode 166 is connected to the input 82 from the L2 terminal of the network. A zener diode 168 is connected between the collector and the emitter of the transistor 164 with the anode of the diode 168 being connected to the collector of the transistor 164. A capacitor 170 is connected across the collector-emitter junction 164. The collector of the transistor 164 is also connected through a capacitor 172 to the anode of a diode 174. The cathode of the diode 174 is connected to the input 82 from the L2 terminal of the network. A resistor 176 is connected across the capacitor 172.

With the selective jumper connection 140 connected to the three digit position at the digital four output 138 of the decade counter 96, up to three digits may be entered or dialed with no restriction. If a fourth digit is dialed, the digital four output 138 of the decade counter 96 becomes high and the capacitor 148 is charged rendering the transistor 146 conductive. The conductive of the transistor 146 quickly discharges the capacitor 158 to render the transistor 154 nonconductive. When the transistor 154 is rendered non-conductive, the transistor 164 is also rendered non-conductive. With the transistor 164 nonconductive, the path of the loop current that was flowing from the input at 82 from the L2 terminal of the network through the collector-emitter path of the transistor 164 and to the signal 64 is opened. The termination of loop current causes the central office equipment connected to the station apparatus 10 to interpret that the phone has been hung up or placed on hook. Thus, the central office equipment drops the call.

The reset input at 91 of the decade counter 96 is connected through a resistor 178 to the cathode of a diode 180. The anode of the diode 180 is connected to the anode of a zener diode 182. The cathode of the zener diode 182 is connected to the loop input 82 from the L2 terminal of network. Thus, with no loop current flowing, there will be approximately 48 volts from the central office supply appearing across the connections at 64 and 82. The zener diode 182 in a specific embodiment is a 33 volt zener. Thus, the zener diode 182 will conduct current through the diode 180 and the resistor 178 to reset the decade counter 96 to a zero output state.

At this point, four digits have been dialed and the loop current has been interrupted so that the central office drops the call from the station apparatus 10. Further, the station apparatus 10 has been reset with the decade counter 96 being reset to the zero output state. Thus, the digital four output output at 138 of the decade counter 96 switches from a high state to a low state and the capacitor 148 begins to discharge slowly. After a fraction of a second, the transistor 146 is again rendered nonconductive and the capacitor 158 begins to charge slowly through the resistor 156. After a subsequent fraction of a second, the transistors 154 and 164 are rendered conductive to restore loop current.

In response, the central office equipment having previously dropped the call now detects loop current flowing again through the station aparatus 10. Thus, the central office responds by recognizing an off-hook status to the station apparatus 10 and by providing dial tone to the station apparatus 10.

Accordingly, the user of the station apparatus 10 has experienced that he can dial three digits with no restrictions but on the fourth digit the station apparatus 10 is returned to dial tone.

In accordance with further aspects of the present invention, the selective jumper connected at 140 can be connected to the digital five output of the decade counter at 184 of the digital six outpput of the decade counter at 186. Thus, with the jumper connection 140 connected at 138 to the digital four output of the decade counter, three digits are permitted to be entered by the user before the call is interrupted. Similarly, with the selective jumper connection 140 connected at 184 to the digital five output, four digits are permitted before a call is interrupted. Further, if the selective jumper 140 is connected at 186 to the digital six output, five digits are permitted to be entered before the call is interrupted.

Thus, the selective jumper connection 140 may be connected to the three, four or five digit position in accordance with desired local central office numbers that are to be allowed without restriction. Further, the station apparatus 10 may be field programmed by maintenance personnel to either the three, four or five digit position as desired.

Further, a non-restricted connection 187 is provided. With the jumper 140 connected to the NR position 187, dialing of any call is unrestricted. The NR position is useful for special situations and testing. Another jumper connection at 189 is provided at the digital one output of the counter 96. This connection is utilized for special applications where only operator calls are unrestricted.

As an additional fail safe provision, should the station apparatus 10 due to a possible malfunction allow a seven digit local call to be entered, the reverse battery answer supervision will reverse bias the diode 166 and after approximately ¼th of a second, the loop current will also be interrupted through the capacitor 172 after the capacitor has been charged. Thus, even in this event, the loop current will again be interrupted and the central office equipment will again drop the call. At this point, normal polarity will be restored and the diode 166 would again begin conducting and the central office equipment would again provide dial tone to station apparatus 10. Thus, even if seven digits were passed by the station apparatus 10 due to some malfunction, the call would be returned to dial tone. A selective jumper connection 191 is provided across the capacitor 172. In the A position, the jumper 191 shunts the capacitor 172. The A position is useful for central office equipment where answer supervision by the operator might interrupt the call. The B position of the jumper 191 provides normal operation.

Thus, the station apparatus 10 allows for the completion of calls that do not exceed a predetermined number of digits and all operator handled calls including "0+" dialing. Further, local calls are prevented that include a greater number of digits than programmed.

If "1+" calls are to be allowed without restriction, a selective jumper connection 190 connected between the negative reference 32 and the junction of the resistor 108 and the diode 110 is disconnected. Thus, if a 1 numeral is entered on the key pad array 26, the clock enable input at 134 will be switched to a low level and the counter 96 will be disabled. Accordingly, "1+" dialed calls will not be restricted.

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. Telephone station apparatus of the type including a conventional ringer, telephone hand set, hook switch and protective network for handling calls without the use of coins and for use with central office equipment that does not include local call exclusion features, the station apparatus comprising:
   means responsive to a user for entering the digits of a call including the numerals 1 through 0 and the symbols * and # and for generating multifrequency tone signalling in response to the entered digits; and
   control means responsive to said entering and tone signalling means for restricting entered calls having more than a predetermined number of digits, for allowing calls where the first digit entered is a zero, and for allowing calls having a number of digits equal to or less than said predetermined number, said control means comprising means for counting the number of digits entered and loop control means for controlling the current loop to the central office and through the station apparatus, said digit counting means comprising means for generating a reject control signal when the entered number of digits exceeds said predetermined number, said loop control means being responsive to said reject control means to interrupt the current loop to the central office, said control means further comprising means for disabling said counting means when the first entered digit is the numeral 0 and means for disabling said counting means when the first entered digit is the numeral 1.

2. The telephone station apparatus of claim 1 wherein said reject control signal generating means comprises means for selectively varying said predetermined number of digits defining a rejected or allowed call.

3. The telephone station apparatus of claim 1 wherein said control means further comprises means for selectively determining said predetermined number of digits for allowed calls.

4. The telephone station apparatus of claim 1 wherein said loop control means comprises means responsive to reverse polarity answer supervision from the central office to interrupt the loop current.

5. The telephone station apparatus of claim 1 wherein said control means further comprises means responsive to said station apparatus going off hook for resetting said digit counting means when the off-hook status of said station apparatus is detected.

6. The telephone station apparatus of claim 1 wherein said predetermined number of digits is three.

7. The telephone station apparatus of claim 2 wherein said predetermined number of digits is 3, 4 or 5.

8. The telephone station apparatus of claim 1 wherein said reject control signal generating means is responsive to the output state of said digit counting means.

9. The telephone station apparatus of claim 8 wherein said digit counting means is a digital counter including at least one digital output state signal, said reject control signal generating means being connected to the digital output state signal of said counter being defined as one plus said predetermined number.

10. The telephone station apparatus of claim 1 wherein said digit entry and tone signalling means comprises a first tone signalling output and a second output that provides a pulse signal in response to the entry of each digit.

11. The telephone station apparatus of claim 10 wherein said digit counting means includes a clock input connected to said second output of said digit entry and tone signalling means.

12. The telephone station apparatus of claim 1 wherein said digit entry and tone signalling means comprises an array of key pad areas actuable by a user for the entry of digits, means responsive to the actuation of each key pad area for generating an output corresponding to the actuation of each respective key pad area, and a tone signal generator responsive to actuation of each key pad area for generating multifrequency tone signalling indicative of said respective key pad area that is actuated.

13. Telephone station apparatus of the type including a conventional ringer, telephone hand set, hook switch and protective network for handling calls without the use of coins and for use with central office equipment that does not include local call exclusion features, the station apparatus comprising:

means responsive to a user for entering the digits of a call including the numerals 1 through 0 and the symbols * and # and for generating multifrequency tone signalling in response to the entered digits; and control means responsive to said entering and tone signalling means for restricting entered calls having more than a predetermined number of digits, for allowing calls where the first digit entered is a zero, and for allowing calls having a number of digits equal to or less than said predetermined number, said control means comprising means for counting the number of digits entered and loop control means for controlling the current loop to the central office and through the station apparatus, said digit counting means comprising means for generating a reject control signal when the entered number of digits exceeds said predetermined number, said loop control means being responsive to said reject control means to interrupt the current loop to the central office, said control means further comprising means for disabeling said counting means when the first entered digit is the numeral 0, said disabling means comprising latch means responsive to the entry of the numeral 0 for disabling said counting means as long as the station apparatus is off-hook, said disabling means further comprising lock out means responsive to the state of said digit counting means for locking out operation of said disabling means after the entry of the first digit if the first digit entered is not the numeral 0, said latch means further being responsive to the entry of the numeral 1 for disabling said counting means as long as the station apparatus is off-hook.

* * * * *